(No Model.)

C. RICHARDSON.
CROSSCUT SAW HANDLE.

No. 364,672. Patented June 14, 1887.

Attest:
L. Lee,
Wm Smith. Morison.

Inventor:
C. Richardson, per
Ernest Miller, Atty

UNITED STATES PATENT OFFICE.

CHRISTOPHER RICHARDSON, OF NEWARK, NEW JERSEY.

CROSSCUT-SAW HANDLE.

SPECIFICATION forming part of Letters Patent No. 364,672, dated June 14, 1887.

Application filed February 3, 1887. Serial No. 226,365. (No model.)

*To all whom it may concern:*

Be it known that I, CHRISTOPHER RICHARDSON, a citizen of the United States, residing at Newark, Essex county, New Jersey, have invented certain new and useful Improvements in Crosscut-Saw Handles, fully described and represented in the following specification and the accompanying drawings, forming a part of the same.

The object of this invention is to furnish an economical construction for the slotted bolt and the nut employed in such handles, which I effect by furnishing the upper end of the handle with a tubular sleeve having a nut formed upon its extreme lower end only, thus reducing the labor of tapping the thread in the nut to the lowest point.

Figure 1:
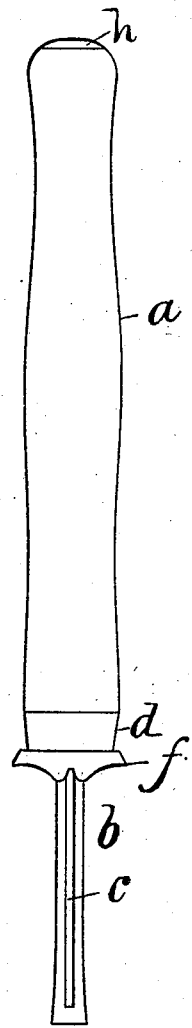
Figure 2:
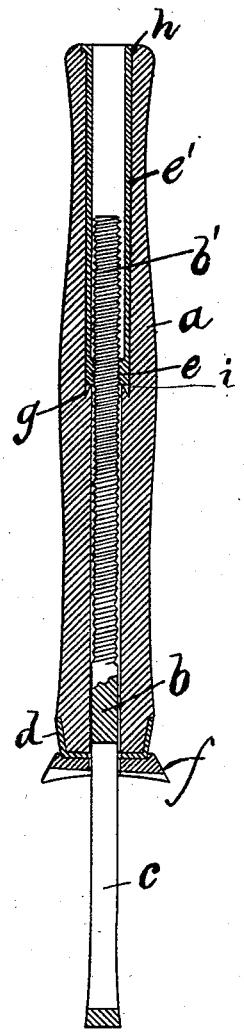

In the drawings, Figure 1 is an external view of the construction, showing the slot in the bolt to receive the end of the saw-blade; and Fig. 2 is a longitudinal section of the same through the center of the slot, the threaded part of the bolt not being sectioned.

$a$ is the handle; $b$, the body of the bolt; $b'$, the threaded end of the same, and $c$ the slot for the saw-blade.

$d$ is a ferrule upon the lower end of the handle, and $f$ the notched washer applied between the same and the edge of the saw.

The nut $e$ is formed upon the lower end of a sleeve, $e'$, which is inserted in a suitable recess in the upper end of the handle and provided with projections $g$, to keep it from turning, and with a collar, $h$, to sustain the pull of the bolt.

The sleeve is made of larger bore internally than the thread of the bolt, and the bolt when inserted through the nut extends upward within the sleeve and is susceptible of adjustment up and down therein, by turning the handle in the usual manner, but without projecting the bolt from the upper end of the handle at any time. The sleeve thus operates to sustain the nut at a considerable distance from the upper end within the handle $a$, while avoiding the transverse slotting of the handle, as in some cases, and the dropping of a nut into a deep socket in the top of the handle, as in United States Patent No. 58,569, of October 9, 1866. Such a loose nut is not readily removed if defective, and is liable to displacement when the end of the bolt is accidentally pushed upward, in which case the bolt is not readily inserted into it again.

The handle from the ferrule to the nut is bored only large enough to pass the bolt freely, and, as the recess required for the sleeve is larger than such bore, a shoulder, $i$, is formed adjacent to the nut and sustains the stress of the nut in addition to the collar $h$ at the upper end of the sleeve. The collar $h$ is shown recessed within the top of the handle, but may be allowed to project, if rounded off, to avoid roughness in using the handle. Prongs $g$ are shown projected from the lower end of the sleeve into the wood of the handle, to keep the sleeve and nut from turning, and tend also to secure the sleeve within the handle, just as a spike holds fast when driven into wood. The prongs thus assist in preventing the loosening of the sleeve and its loss from the handle if the bolt be withdrawn.

I am aware of United States Patent No. 168,003, issued September 21, 1875, and that such patent shows a sleeve similar to mine, provided at its outer end with a cup-shaped appendage to inclose the outer end of the handle, and acts as a brace to protect it from splitting. I do not therefore claim the sleeve as my invention, nor do I use the brace shown in said patent, or any device to keep the handle from splitting. My invention differs from that referred to in the construction of the nut at the inner end only of the sleeve and the formation of prongs thereon, and the making of the bolt so short as never to project beyond the end of the handle. The sleeve being formed by casting, the nut requires only to have the thread formed therein by tapping, and as it is made very short, in comparison with the length of the entire sleeve, the expense of threading the nut is very slight. I therefore disclaim the said Patent No. 168,003, and limit my claim to the sleeve having a short nut formed in its inner end and provided with the prongs $g$ to secure it in the handle.

What I claim herein is—

In a crosscut-saw handle, the combination, with the handle $a$, of the bolt $b$, having slot $c$ and screw-thread $b$, and the sleeve $e'$, inserted in the upper end of the handle and provided with the projections $g$, and having the threaded nut $e$ formed at its inner end only, the whole arranged and operated as and for the purpose set forth.

In testimony whereof I have hereunto set my hand in the presence of two subscribing witnesses.

CHRISTOPHER RICHARDSON.

Witnesses:
 JOHN H. MILNER,
 HENRY J. MILLER.